United States Patent [19]

Sacher

[11] Patent Number: 4,878,571
[45] Date of Patent: Nov. 7, 1989

[54] SHIFTABLE FRICTION CLUTCH FOR GEAR DRIVES

[75] Inventor: Christoph Sacher, Sauerlach/Arget, Fed. Rep. of Germany

[73] Assignee: Carl Hurth Maschinen - und Zahnradfabrik GmbH & Co., Munich, Fed. Rep. of Germany

[21] Appl. No.: 72,148

[22] Filed: Jul. 9, 1987

[30] Foreign Application Priority Data

Jul. 9, 1986 [DE] Fed. Rep. of Germany ....... 3623142

[51] Int. Cl.$^4$ .................. F16D 13/42; F16D 21/00
[52] U.S. Cl. .................. 192/48.91; 192/70.22; 192/70.23; 192/93 A
[58] Field of Search .................. 192/34, 48.91, 70.22, 192/70.23, 93 A, 114 R

[56] References Cited

U.S. PATENT DOCUMENTS

| 2,127,186 | 8/1938 | Perkins | 192/93 A |
| 3,703,226 | 11/1972 | Strehler et al. | 192/48.91 |
| 3,931,874 | 1/1976 | Braun et al. | 192/48.91 |
| 4,287,973 | 9/1981 | Eichinger et al. | 192/70.23 |

FOREIGN PATENT DOCUMENTS 2221979 10/1974 France .................. 192/48.91

Primary Examiner—Leslie A. Braun
Assistant Examiner—David A. Testardi
Attorney, Agent, or Firm—Flynn, Thiel, Boutell & Tanis

[57] ABSTRACT

A friction clutch for gear drives, which friction clutch is constructed as a spring-loaded safety clutch. The gearshift sleeve, which in the sense of the engagement and disengagement, is mounted axially movably and to a limited extent rotatably on the shaft to be engaged. The gearshift sleeve is connected with the shaft through at least one eccentric device rotatable substantially perpendicularly with respect to the axis of the shaft, such that the axial movement of the gearshift sleeve effects in the sense of the engagement both a rotation of the gearshift sleeve relative to the shaft and also the axial additional movement needed to reinforce the contact pressure, whereby the axial additional movement decreases with an increasing relative rotation, and the axial movement of the gearshift sleeve effects in the sense of the disengagement an oppositely directed rotary and axial additional movement, whereby the axial additional movement increases with a decreasing relative rotation. To reinforce the additional movement, a spring locking of the gearshift sleeve in its neutral position can be utilized through suitable shaping.

19 Claims, 9 Drawing Sheets

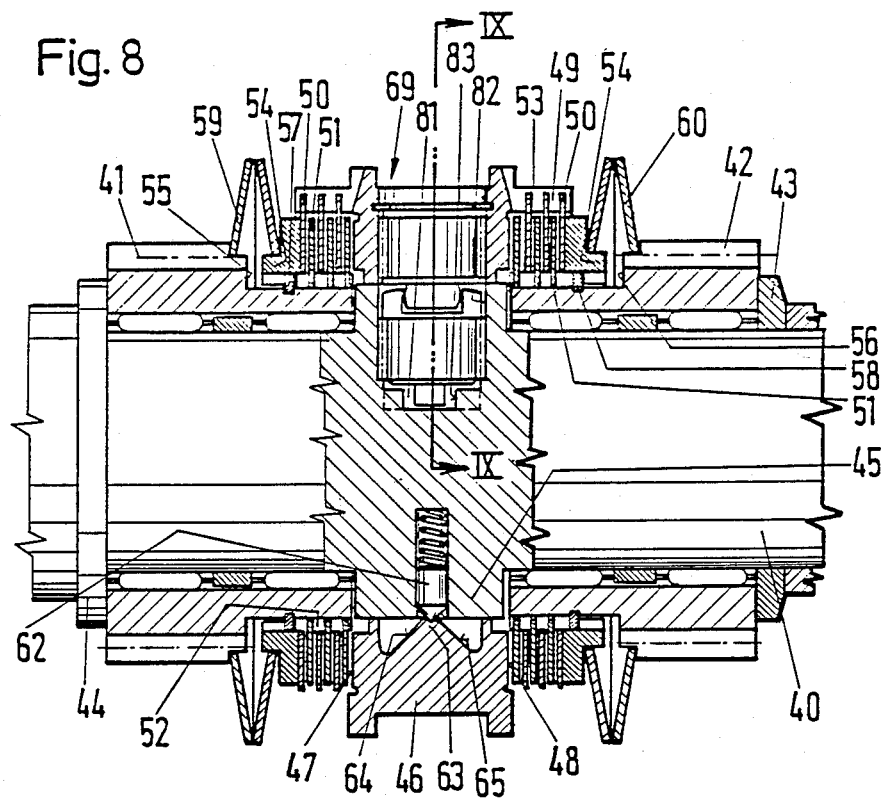
Fig. 8
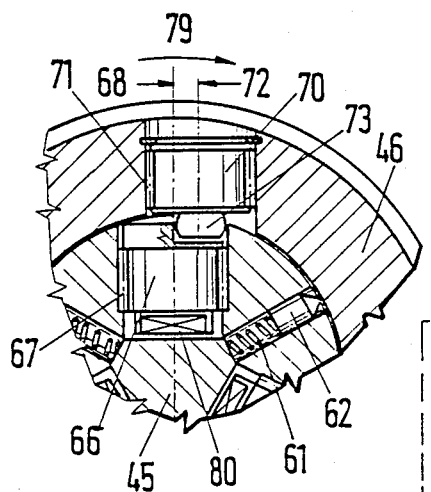
Fig. 9
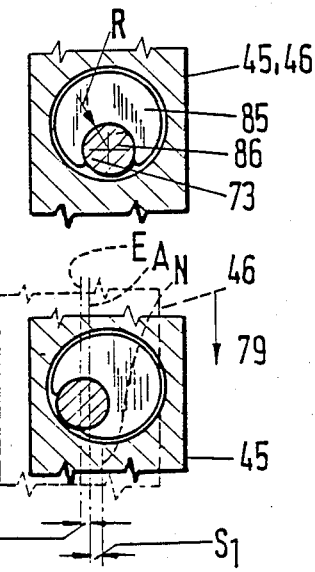
Fig. 12
Fig. 13

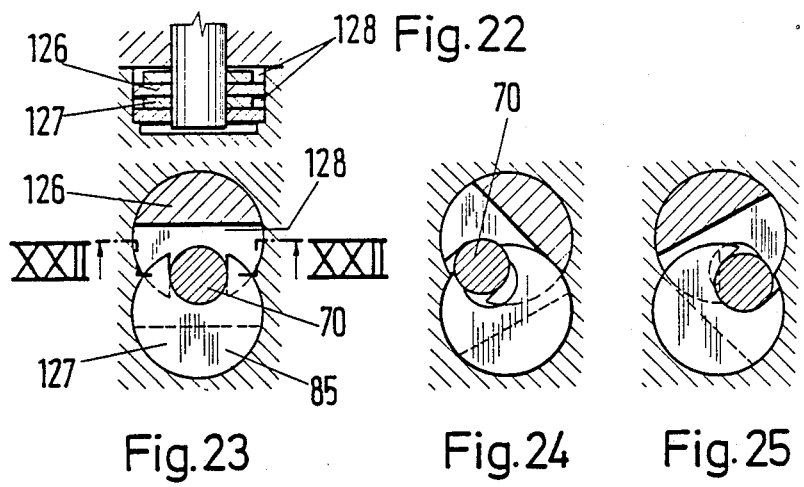
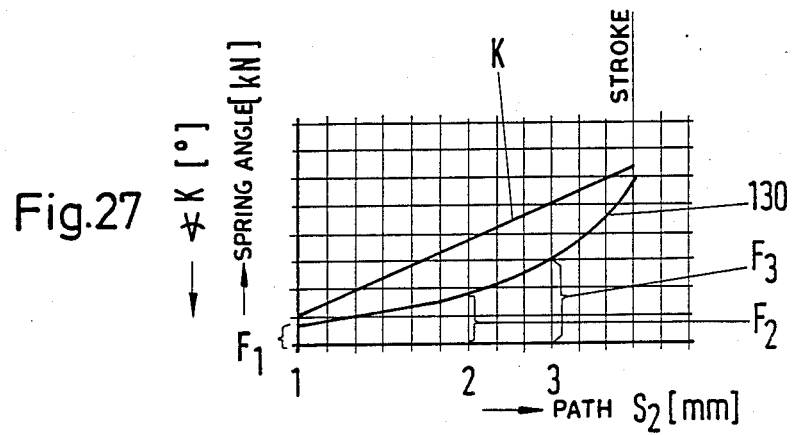
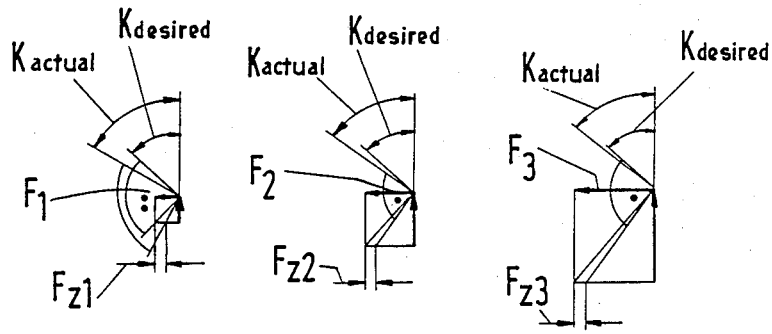

SHIFTABLE FRICTION CLUTCH FOR GEAR DRIVES

FIELD OF THE INVENTION

The invention relates to a shiftable friction clutch for gear drives.

BACKGROUND OF THE INVENTION

The invention is based on a state of the art known from NL-A 8001933. A boat reversing gear is illustrated and described in this state of the art, wherein two gears are supported on a driven shaft and can be coupled by means of a gearshift sleeve and friction clutches, also arranged on the drive shaft, selectively with the shaft. Radially directed bolts are arranged in the gearshift sleeve, one end projecting inwardly out of the gearshift sleeve and into a groove, extending inclined with respect to the plane of rotation, in the driven shaft. The gearshift sleeve is held in a neutral position by means of spring-loaded notches. If an axial force is applied by a lever from outside onto the gearshift sleeve, then the notches are released against their force and the gearshift sleeve is both rotated relative to the shaft and also moved axially through the bolts resting on the groove walls, whereby the friction clutch is engaged and the associated gear is thereby coupled with the shaft.

Even if the friction members of the clutch are supported against a spring, engaging still occurs almost instantaneously. The thereby occurring, so-called engaging impact, can be noticed by a jerking sensation which depending ont he intedsity - is uncomfortable at times in the boat and can also be noticed acoustically.

Furthermore, it is considered to be disadvantageous in the known coupling construction that the force needed for disengaging the clutch is rather great, which is particularly bad during maneuvering or, if in a case of danger a quick reversing of gears is needed.

A guide sleeve which is fixed against rotation, however, is axially movabely mounted on the shaft, is known from German OS No. 28 28 722 in connection with a different type of construction of shiftable friction clutches.

Therefore, the basic purpose of the invention is to provide a friction clutch of the mentioned type so that the mentioned disadvantages are avoided.

SUMMARY OF THE INVENTION

A shiftable friction clutch for drive gears, which shiftable friciton clutch is constructed as a spring-loaded safety clutch. The clutch includes a gearshift sleeve which, in the sense of the engagement and disengagement, is mounted axially movably and to a limited degree rotatably on the shaft to be engaged. The gearshift sleeve is supported to produce the contact pressure by means of a free end of bolts received in it and directed at least approximatily radially on inclined surfaces, inclined with respect to the plane of rotation, on the shaft. At least one friction member is provided which is axially movable by means of the gearshift sleeve belonging to a first clutch half and which through friction surfaces cooperates with at least one other friction member belonging to a second clutch half. The friction members, which during the engaging operation are pressed onto one another, are supported against a spring. At least one spring-loaded drop-in pin is also provided which is guided radially movable in the shaft, which drop-in pin locks the gearshift sleeve in a neutral position and which during engagement produces an axially directed initial force on one inclined surface of the gearshift sleeve. The inclined surfaces in the area of the contact of the bolts in the neutral position of the friction clutch define a larger angle with the plane of rotation than in the area of the contact of the bolts with the engaged clutch.

BRIEF DESCRIPTION OF THE DRAWINGS

The invnention will be described hereinafter in connection with several exemplary embodiments, which are illustrated in a total of 34 figures.

In the drawings:

FIG. 8 is a longitudinal cross-sectional view of an inventive design of a clutch in its neutral position;

FIG. 9 is a partial cross-sectional view taken along the line IX—IX of FIG. 8;

FIGS. 10 to 12 show different shapes of the blocks in the neutral positon of the clutch;

FIG. 13 illustrates the blocks of FIG. 12 in the position with the clutch engaged;

FIGS. 22 and 23 schematically illustrate, analogous to FIG. 15, the arrangement of two blocks and their cooperation with the bolts in a neutral position of the clutch;

FIGS. 24 and 25 illustrate the position of the blocks and the bolt of FIG. 22 in the position with the clutch engaged, ananlogous to FIG. 19, for two different directions off rotation;

FIG. 27 illustrates a spring characteristic curve above the feed path;

FIGS. 28 to 30 illustrate the relationship between the spring force and the addition force at three points of the feed path;

DETAILED DESCRIPTION

Figure 1:
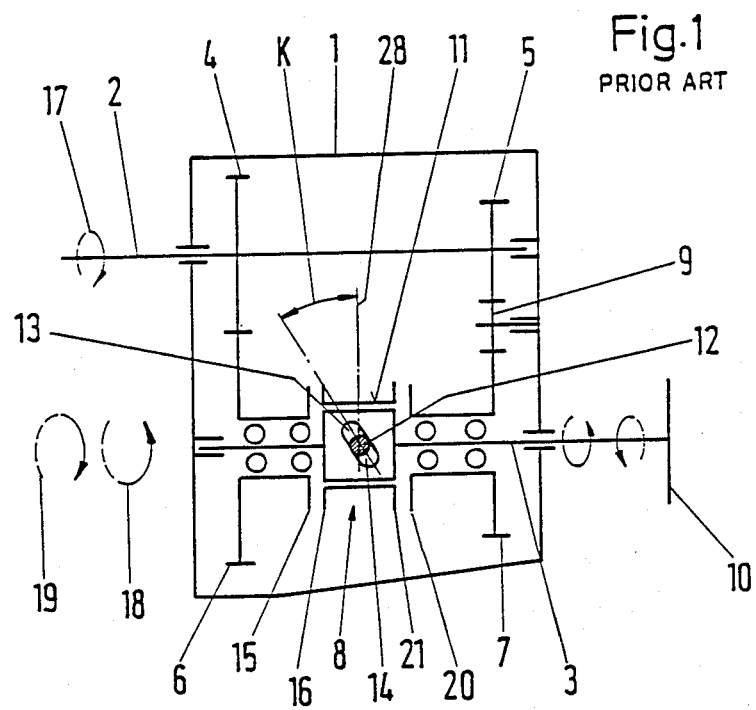
FIG. 1 is a schematic illustration of a gear drive with a clutch according to the state of the art.

FIG. 1 illustrates in a much simplified manner, a gear drive with a common clutch, as it is used particularly in boat reversing gears. A drive shaft 2 with two gears 4, 5 and a driven shaft 3 are supported in a housing 1. Two gears 6, 7 are supported rotatably on the drive shaft 3, which gears 6, 7 can be coupled selectively with the drive shaft 3 by means of a friction clutch 8. The gear 6 engages the gear 4 and the gear 7 engages an intermediate gear 9 also supported in the housing, which intermediate gear 9 furthermore engages the gear 5. The drive shaft is connected to a otor (not illustrated) at its end projecting from the housing 1 and a further shaft, for example a propeller shaft (not illustrated), can be connected to a flange 10 at the end of the driven shaft 3, which end projects from the housing 1. A gearshift sleeve 11 is mounted axially movably and , to a limited extent, rotatably on the driven shaft 3. The driven shaft 3 is for this purpose provided with radially directed bolts 12, which rest on the groove walls (inclined surfaces 13) of grooves 14 provided in the driven shaft 3. If upon rotation of the drive shaft 2 in arrow direction 17, the gearshift sleeve is moved out of the illustrated neutral position, for example to the left in order to couple the driven shaft 3 with the gear 6, the gear 6 is then rotated, due to the bolts 12 resting on the inclined surfaces 13, in arrow direction 18 relative tot eh driven shaft 3, which causes the pressure between the friction members 15, 16 connected to the gear 6 and to the gearshift sleeve 11 to be increased (servo-effect). Whereas if the gearshift sleeve is moved to the right duriñg a constant drive direction of rotation in order to couple the driven shaft with the gear 7, the gear 7 is then rotated in arrow direction 19 and increases in this manner the contact pressure between the friction members 20, 21.

Figure 2:
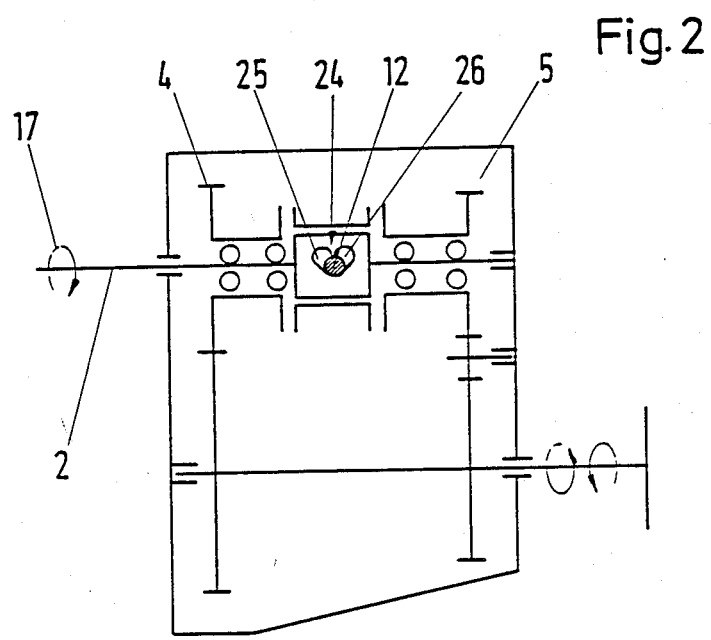
FIG. 2 illustrates a modification of the gear drive according to FIG. 1.

Should the friction clutch 20 on the drive shaft be arranged between the gears 4, 5 (which for structural or spacial reasons in no longer possible), then the use of straight, through-going grooves 14 is not possible in any case. Rather, curved grooves 24 with oppositely directed inclined surfaces 25, 26 must then be provided (FIG. 2). Otherwise, due to the always constant direction of rotation 17 of the drive shaft, one of the gears 4, 5 could not be coupled with the drive shaft 2.

Figure 3:
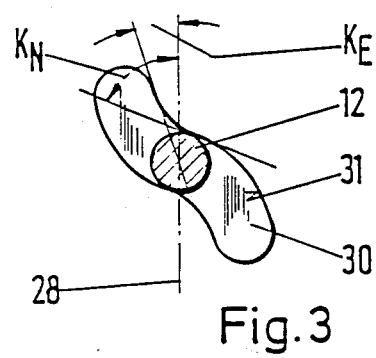
FIGS. 3 to 7 show different inventive designs of the inclined planes.
Figure 4:
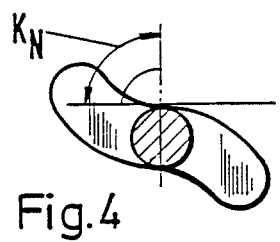

To reduce the shifting impact and to reduce the disengaging force, an angle K defined between the plane of rotation 28 and in inclined surface 13 is, according to the invention, not supposed to be constant over the entire shifting path. A curved groove 30 is provided for this reason (FIG. 3), the inclined surface 31 of which, in the area of contact with the bolt 12 in the neutral position, extends at a more acute angle $K_N$ than during the further extent of the groove 30 up to the area of contact of the bolt with the clutch engaged. A calculated or experimentally determined angle $K_E = K_{desired}$ exists in the last mentioned area, which angle may exist at a maximum for an automaticlaly running shifting operation or for the subsequently occuring power and transmission movement. As long as the angle $K_{actual}$ to a desired area of the inclined surface is larger than the angle $K_{desired}$, an additional force $P_z$, which will be discussed later on, is needed to carry out the shifting operation. The angle $K_{actual}$ can in the neutral positon be 90° in the extreme case, as shown in FIG. 4.

Figure 5:
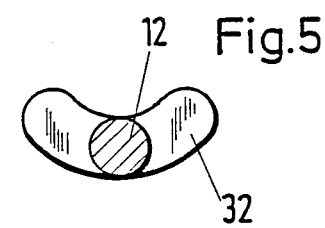

For a clutch analogous to FIG. 2, which operates in a direction of rotation which is always constant, the groove identified by the reference nyumeral 32 therein has then the shape illustrated in FIG. 5. The large axial paths between the neutral and the end postion can have here a disadvantageous effect on the space needed by the clutch. In order to be able to raalize short axial paths, the contact of the bolts 12 can in the extreme case be an edge 35 formed by the groove walls 33, 34. The bolt 12 rolls along the edge 35 at the start of the shifting operation prior to it arriving in the actual groove 36, 37. Due to the high specific pressure between the edge 35 and the bolt 12, this embodiment is used only in special cases.

According to another exemplary embodiment, it is also possible to support the bolts 12 on other bolts 38, which project radially from the drive shaft 2 or the driven shaft 3. The surface 39 of the bolt 38 takes then over the function of the inclined surfaces 33, 34. A not illustrated roller bearing for the bolts 12, 38 in the gearshift sleeve 11 and in the drive shaft 2 is thereby preferable.

Figure 6:
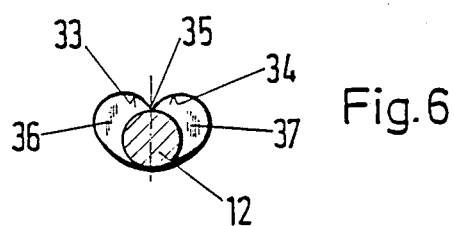
Figure 7:
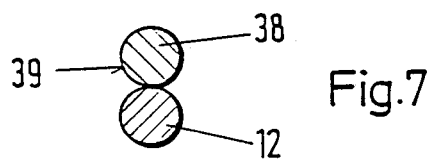

A clutch, which combines in it the advantages of the short shifting paths according to FIG. 6 and the roller-bearing supported bolts according to FIG. 7, is shown in connection with a double clutch illustrated in FIGS. 8 to 13. To the double clutch is connected a shaft 40 selectively with gears 41, 42, which are supported rotatably on the shaft 40 and are held axially by suitable means, for example by plates 43 or a shoulder 44. The shaft 40 is provided with a flange or the like between the two gears 41, 42, which flange is used as a gearshift-sleeve carrier 45. A gearshift sleeve 46 is axially movable within certain limits ont he gearshift-sleeve carrier 45 and is mounted for rotation in peripheral direction. The gearshift shift sleeve 46 has pressure surfaces 47, 48 on both sides and projections 53 with recesses 49 for receiving the noses of outer disks 50. The outer disks 50 cooperate with inner disks 51 which engage with an internal tooth system a corresponding external tooth system 52 of the gears 41, 42. The so formed disk packages are each supported axially outwardly by a pressure plate 54. The pressure plates 54 are arranged with axial play next to the disks 50, 51. The play is limited in the one side by shoulders 55, 56 on the gears 41, 42 and on the other side by snap rings 57, 58. The latter are arranged such that the pressure plates 54 loaded by the cup springs 59, 60 in the direction of engagement do not compress the disks 50, 51 when the gearshift sleeve 46 is in the neutral position (as illustrated in FIG. 8).

At least one drop-in pin 62 loaded by a spring 61 is guided for radial movement in the gearshift-sleeve carrier 45. A conforming locking groove 63 is provided in the center of the gearshift sleeve 46 to releasably lock the gearshift sleeve in disengaged condition (neutral position). Inclined surfaces 64, 65 are provided adjacent the locking groove. The drop-in pin 62 supports in cooperation with the inclined surfaces 64, 65 the respective engaging operation by applying an initial force to the gearshift sleeve 46 betweeen the points A and E of the shifting path $S_2$. Furthermore the drop-in pin 62 resting on the corresponding inclined surface 64, 65 fixes the engaged condition at Point E.

Furthermore at least one structural part 66, hereinafter identified as a block, is received rotatably about a radial axis 68 in roller bearings 67 in the gearshift sleeve carrier 45. A bolt 70 rotatable about an axis 72 which is parallel to the axis 68, however, offset in peripheral direction is received in the gearshift sleeve 46 in roller bearings 71. The axis 72 of the bolt 70 lies thereby, viewed in direction of rotation 79, in the neutral position behind the axis 68 of the block 66. The bolt 70 projects with a spherical peg 73 offset in diameter into a recess 74 of the block 66 having a semicircular 75 or crescent-shaped 76 cross section in this area. The peg 73 rests int he neutral position on a point of the straight 77 or concave side surface 78 of the block 66, which point is tangent to the axis 68.

During an engagement of the clutch by moving the gearshift sleeve 46, for example to the left like in FIG.

8, and idle path is first covered and the disk play is cancelled. (The gearshift sleeve can for example be moved by a not illustrated trip cam engaging a peripheral groove 69 of the gearshift sleeve and be rotated with a gearshift lever, which is also not illustrated). The gearshift sleeve 46 has left the neutral position N of the path $S_1$ covered up to then and has reached a position A. The dropin pin 62 rests now on the inclined surface 65 and produces the initial force which is also directied to the left like in FIG. 8, which initaial force is needed together with an additional force $P_z$, in order to permit the further shifting operation over the path $S_2$ to an end position E to occur independently, this means without being able to influence from outside or without having to influence from outside. The independent sequence of operation of the shifting operation is supported by the eccentric action of the block 66. Namely as soon as the gearshift sleeve has left the neutral position N, the axis 68 of the block 66 and the axis 72 of the bolt no longer lie in one common plane. Since the block 66 cannot escape to the right or left like in FIG. 8, it is forced into a rotation by the bolt 70, which rotation presses the bolt 70 and thus the gearshift sleeve still further to the left and thus effects a stronger compression of the disk package 50, 51.

The blocks 66 have at their ends remote from the bolt 70 a bar 80. Each bar 80 projects into a recess 81 following a bore 82 of the gearshift-sleeve carier 45, which bore receives the block 66, namely in the neutral position of the gearshift sleeve 46 with play on both sides. The bars 80 act. together with the walls 83 of the recesses 81, as a stop for the blocks 66, which thus can rotate only through a limited angle. Since during engagement the rotation of the blocks 66 act as an eccentric onto the gearshift sleeve 46, the gearshift sleeve needs for its axial movement also a mobility in peripheral direction. Since on the other side the walls 83, functioning as a stop, limit the rotation of the blocks 66, they also serve as a stop for the axial movement of the gearshift sleeve 46. Th gearshift sleeve 46 does not during engagement press the disks 50, 51 against a fixed end plate, but against the resilient pressure plates 54. The on the tension of the springs 59, 60.

Figure 10:
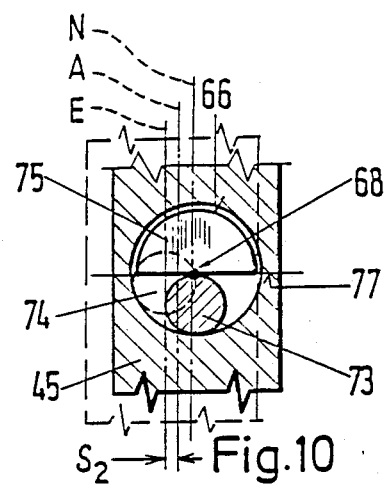
Figure 11:
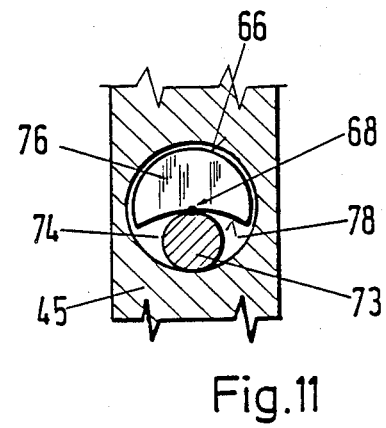

FIGS. 10, 11 show that the semicircular 75 or crescent-shaped 76 cross section of the block requires a relatively long pant $S_2$ between the start of the independent course of the shifting operation (position A of the gearshift sleeve 46) and the end of the shifting operation (position E of the gearshift sleeve). Therefore, a horseshoe-shaped cross section 85, as shown in FIGS. 12 and 13, in which the concave side surfaces 86 are pulled around the peg 73 such that its radius of curvature R corresponds substantially with half the diameter of the peg 73, is more advantageous. Moreover, this design offers the advantage of a lower specific pressure between peg 73 and side surface 86.

The addition of the shifting paths $S_1$ and $S_2$ in the exemplary embodiment according to FIG. 8 results in a relatively long path which the gearshift sleeve 46 must cover between the neutral position N and the engaging position E. A shorter total path can be achieved with the embodiment of a double clutch illustrated in FIGS. 14 to 17 (neutral position) or 18 to 21 (engaging position).

A shaft 90 is connected selectively with gears 91, 92 to the clutch. The gears 91, 92 are supported rotatably on the shaft 90 and are held in axial direction with suitable means, for example snap rings 93, 94. A guide sleeve 95 is mounted on the shaft 90 with at least one key or multiple splines 89 fixed against rotation, however, axially movable between the two gears 91, 92. A gearshift sleeve 96 is mounted axially movably within certain limits and rotatably in peripheral direction on the guide sleeve 95. The gearshift sleeve 96 has on both sides pressure surfaces 97, 98 and projections 103 with recesses 99 for receiving the noses of outer disks 100. These cooperate with inner disks 101 which, with an internal tooth system, engage a corresponding external tooth system 102 of the gears 91, 92. The external tooth system 102 is in FIG. 14 arranged on a disk carrier 105 connected fixed against rotation to the gear 91, 92. The external tooth system can also be placed directly on the gear, if same is suitably designed. A pressure disk 104 resting on the gear 91, 92 is provided - as the last inner disk so to speak - on the side of the disk package 100, 101 remote from the gearshift sleeve 96. The disks 100, 101 have axial play between the gearshift sleeve 96, which is in the neutral position, and the pressure disk 104.

Annular chambers 106, 107 exist between the gears 91, 92 and the guide sleeve 95, which chambers are limited inwardly by the O.D. of the shaft 90 and outwardly by the desk carriers 105 or the external tooth system 102. The chambers 106, 107 receive spring packages 108, 109 formed by cup springs. The packages are supported against and between the guide sleeve 95 and angled rings 110, 111 on the snap rings 94 and thus the shaft 90. The guide sleeve 95 is in this manner held in its neutral position. The cup springs are centered on the angled rings 110, 111 and on projections of the guide sleeve 94. During an axial movement of the guide sleeve, which will be discussed later on, rings 112, 113 can exercise an additional guiding function namely, they prevent the spring packages from being compressed flat. At least one drop-in pin 115 loaded by a spring 114 is guided movably in the guide sleeve 95. The guide sleeve 95 has suitable pockets 118 to receive at least the one torsion spring 114 and at least the one drop-in pin 115. The spring 114 is designed as a torsion spring, the one leg of which is fixed in the guide sleeve 95, for example is wound around a pin 119 penetrating through the pocket 118, and the other leg of which projects into a radial recess 116 of the gearshift sleeve 96, where it is supported in a ball or roller-shaped slide piece 117. The winding of the spring 114 fits into a slot 121 of the drop-in pin 115 and urges the pin in the neutral position of the gearshift sleeve 96 radially against a locking groove 120 in the gearshift sleeve 96. Inclined surfaces 124, 125 are provided on both sides of the locking groove 120 in the gearshift sleeve 96. The drop-in pins 115 cooperate with the inclined surfaces in the same manner as the above described drop-in pins 62 with the inclined surfaces 64, 65. The torsion springs 114 and the drop-in pins 115 can be used advantageously in the same arrangement also in the clutch according to FIGS. 8, 9 in place of the springs 61 and the drop-in pins 62.

At least one block 66 is furthermore received in the guide sleeve 95 and at least one associated bolt 70 is received rotatably in the gearshift sleeve 96. The arrangememt and the support of at least one block 66 and of at least one bolt 70 are the same as above described. Also the block 66 is again provided with the bar 80, which projects into the recess 81 constructed as a stop.

Figures 18, 19, 26:
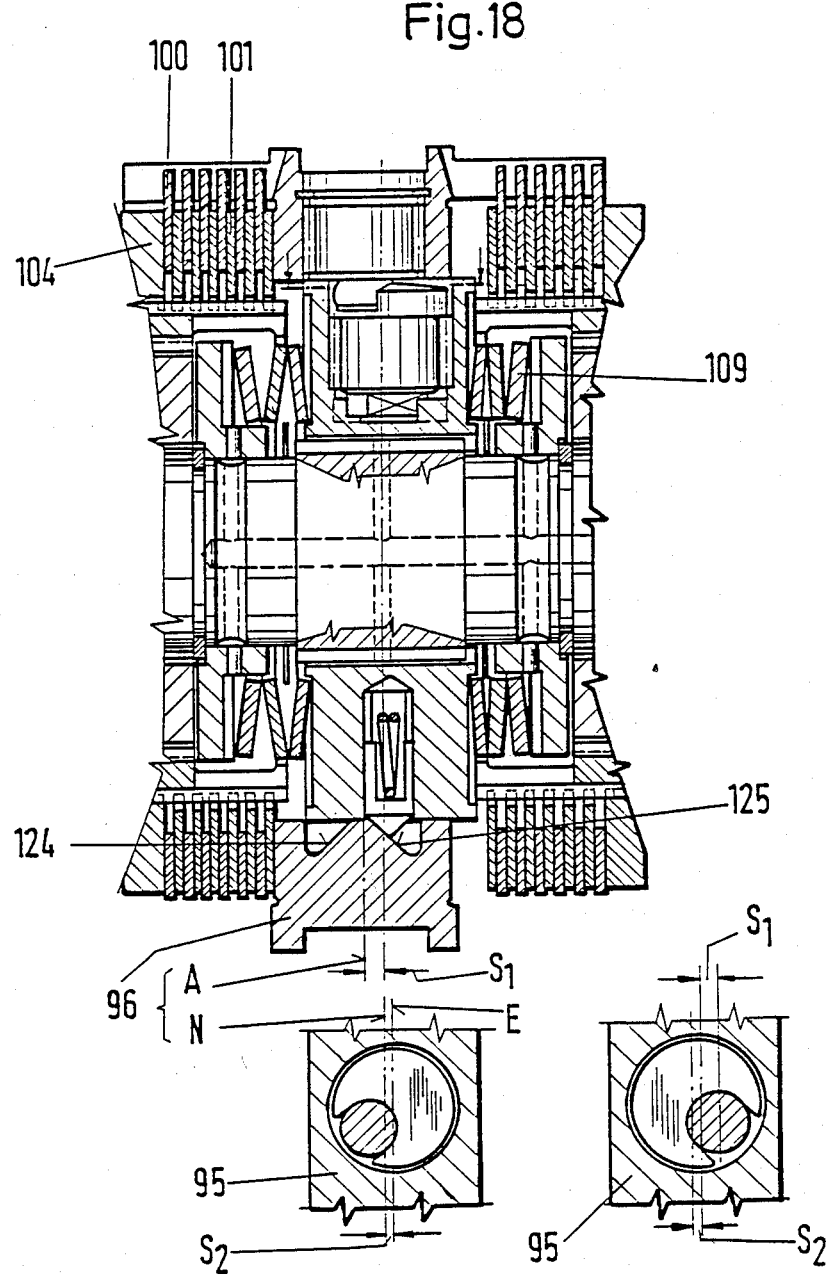
FIGS. 18 to 21 show the same parts as FIGS. 14 to 17, however, in the positon with the clutch engaged.
FIG. 26 illustrates the situatuin of FIG. 19 for the other shifting position.

During an enaging of the clutch by moving the gearshift sleeve 96, for example to the left like in FIG. 18, an idle path is first again covered and the disk play is cancelled. It thereby leaves the neutral position N and arrives after a path $S_1$ at the position A, starting from which the further shifting operation occurs independently, which is supported by the eccentric actio of the block 66. The gearshift sleeve 96 presses thereby the disks 100, 101 against the rigid pressure disk 104, while the guide sleeves 95 is supported yielding in opposite direction against the spring package 109. Thus the eccentric action does not produce a further axial movement of the gearshift sleeve 96 to the left, but a movement of the guide sleeve 95 to the right. Thus this path $S_2$ is not added to the path $S_1$, so that the gearshift sleeve 96 - in contrast to the above-described gearshift sleeve 46 - must cover only this path $S_1$. The maximum frictional force between the disks 100, 101 thus depends on the tension of the spring package 109.

Figures 20, 21:
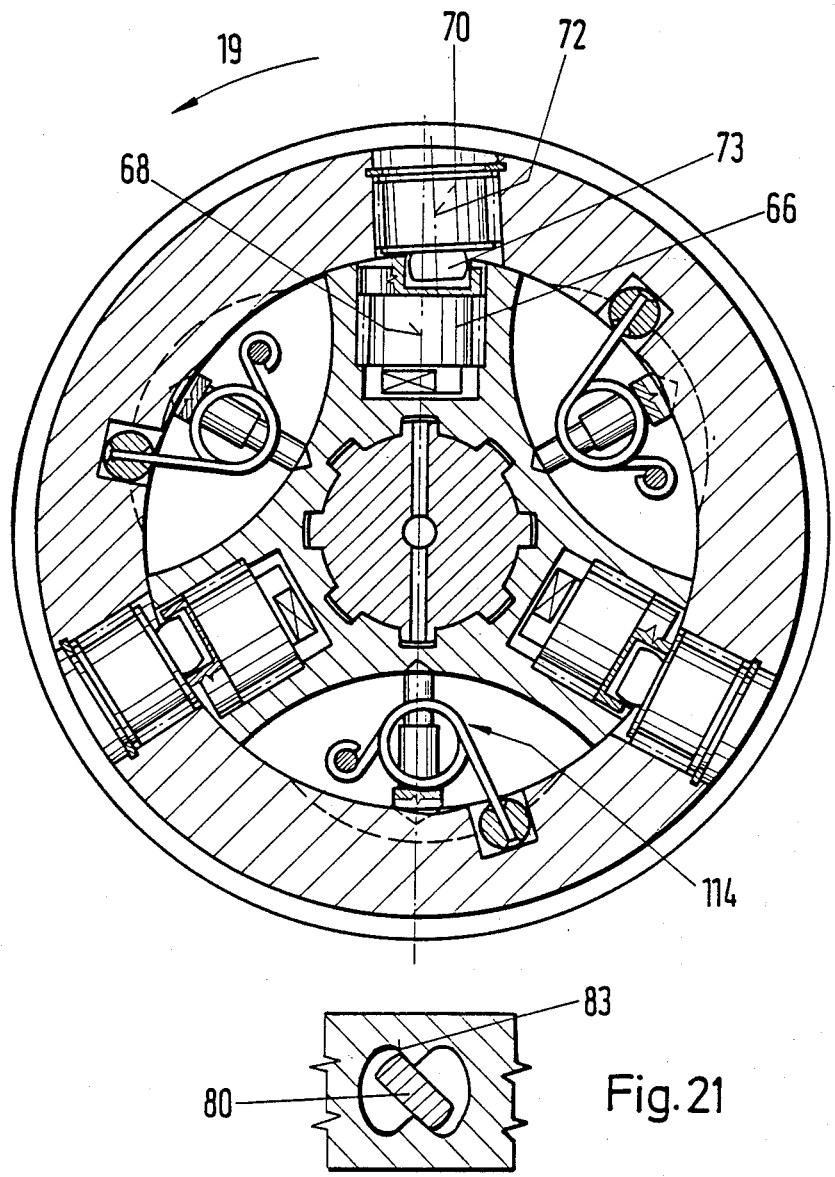

When the gearshift sleeve 96 is rotated due to the eccentric action relative to the guide sleeve 95 (arrow direction 19), an inclined position results between the bolt 70 and the block 66 or between the axes 72, 68 (FIG. 20). In order to assure in spite of this a satisfactory cooperation of the parts, the peg 73 is designed spherically at the lower end of the bolt 70.

The eccentric action is further reinforced by the springs 114 which are under initial tension. The expanding force resulting therefrom effects a rotation of the gearshift sleeve 96 relative to the guide sleeve 95 in arrow direction 19. This expanding force decreases thereby, which, however, has no negative influence because of the increasing action of the eccentric. A small radial force component exists in the neutral position N, which force component presses the drop-in pin 115 into the locking groove 120. This force component increases only with an increasing exapnsion and is changed into an axial force through the cone apex of the drop-in pin 115 and the inclined surfaces 124, 125.

Figure 14:
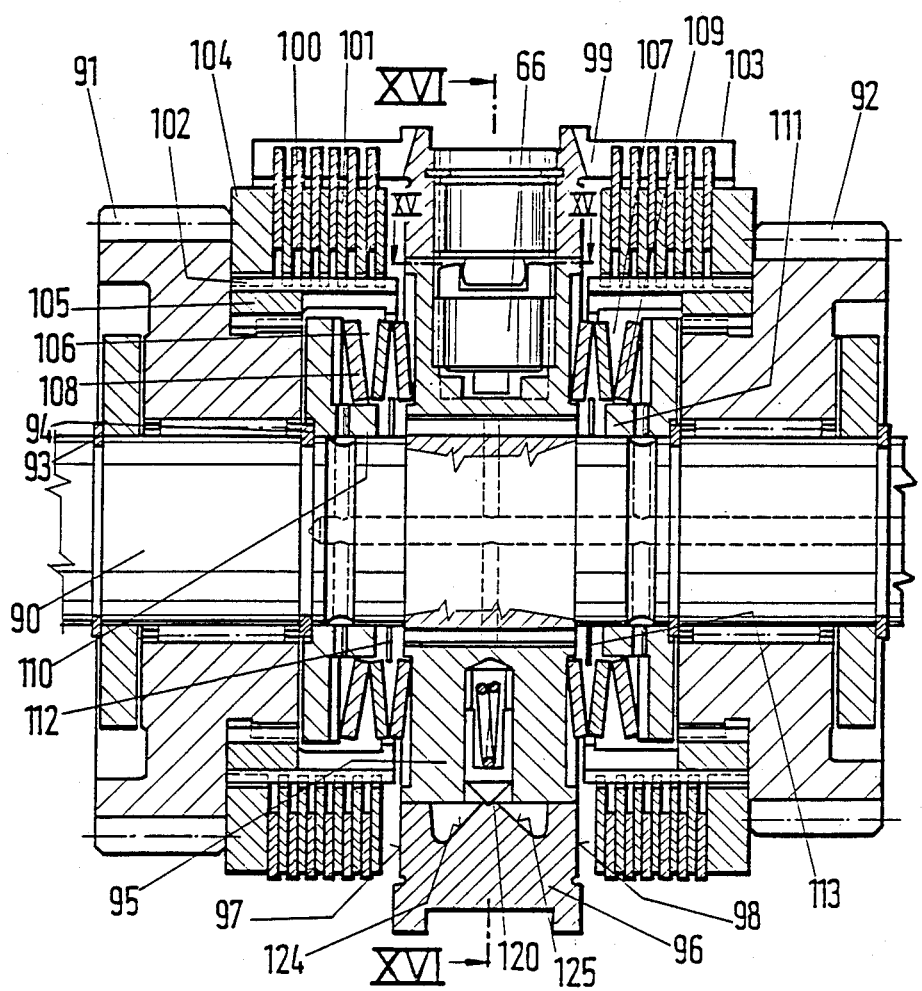
FIG. 14 illustrates a longitudinal cross-sectional view of another embodiment of the inventive clutch in its neutral position.
Figure 15:
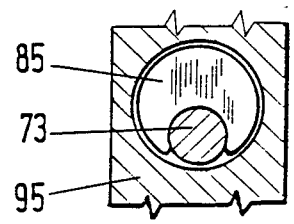
FIG. 15 is a cross-sectional view taken along the line XV—XV of the clutch of FIG. 14.
Figure 16:
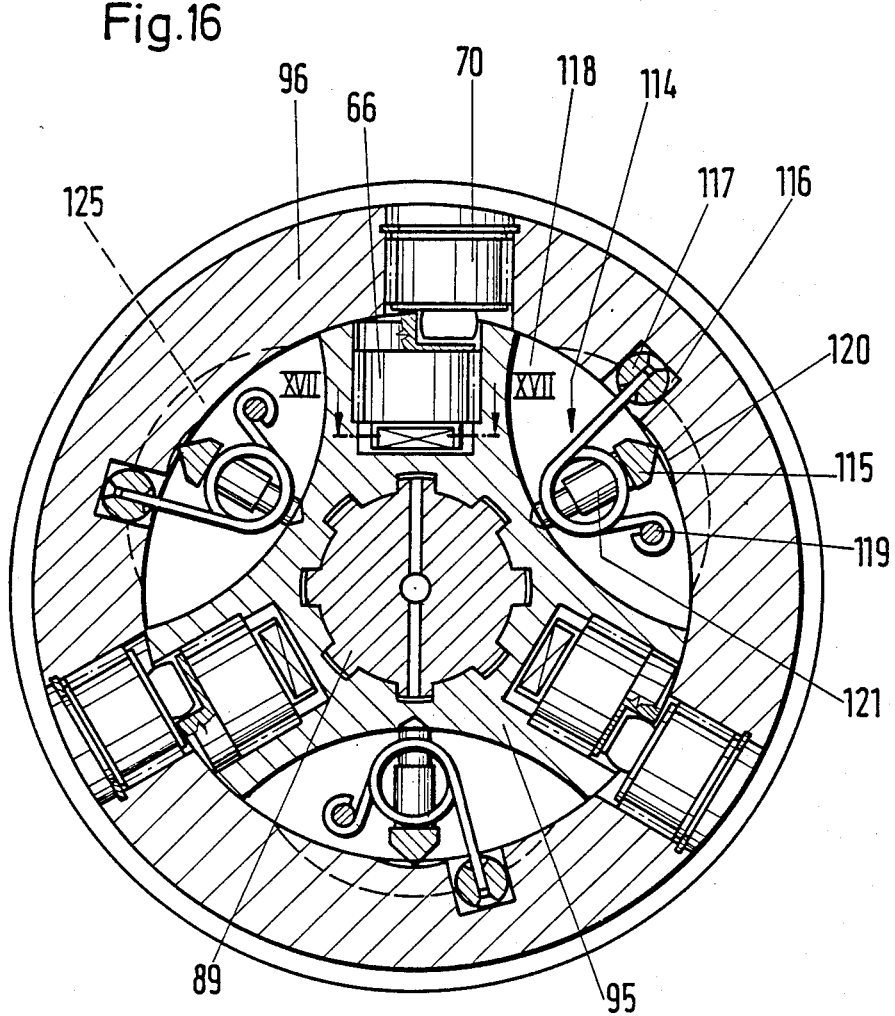
FIG. 16 is a cross-sectional view taken along the line XVI—XVI of the clutch of FIG. 14.
Figure 17:
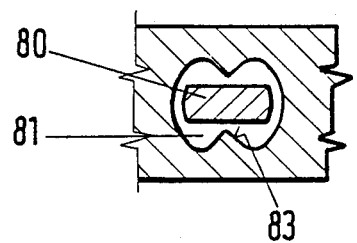
FIG. 17 is a partial cross-sectional view taken along the line XVII—XVII of a stop illustrated in FIG. 16.

When the gearshift sleeve for coupling of the gear 92 with the shaft 90 is moved to the right like in FIG. 14, then all movements occur, however, in the opposite direction. FIG. 26 shows analogous with FIG. 19 the then existing end position E of the bolt 70 and of the block 66.

The aforedescribed clutch with the block 66 with semicircular, cresent or horseshoe-shaped cross section can be used only at an always constant direction of rotation 17 of the shaft 40, 90. The schematic of FIGS. 22 and 23 (neutral position) or of FIGS. 24 and 25 (engaging position) show an arrangement which can be used for both directions of rotation 17, 22 of the shaft 40, 90. Two blocks 126, 127 are provided here, the horseshoe-shaped cross sections 85 of which are provided with slots 128 into which projects the horseshoe-shaped cross section of the respective other block 127, 126. Depending on whether the gearshift sleeve is moved to teh left (FIG. 24) or to the right (FIG. 25), the bolt 70 or rather its peg 73 acts onto the block 126 or onto the block 127. The respective other block 127, 126 is also swung out of its neutral position, however, it thereby does not take on any task because the bolt 70 is not supported on it.

As already mentioned above, in order to accomplish the shifting operation an additional force $P_z$ is needed in addition to the axial force produced by the drop-in pins 62, 115 over the inclined surfaces 64, 65; 124, 125, in order to overcone the hindrance created by the respective angle $K_{actual} < K_{desired}$. The existence of an angle $K_{desired}$ is so to speak simulated with the additional force $P_z$ to be applied from outside. In connection with a progressive spring characteristic curve 130 of the spring packages 59, 60; 108, 109 (FIG. 27), it is possible to manage with an at least approximately constantly small additional force $P_z$ over the entire shifting path $S_2$.

The force can be produced by the torsion spring 114. FIG. 27 shows, aside from the spring characteristic curve 130, also the angle K above the shifting path $S_2$. FIGS. 28 to 30 show the necessary additional force $F_z$ for the points 1, 2 and 3 on the shifting path, whereby 1 corresponds with the initial position A and 3 with the normal end position E. It is clear, that $F_{z1}$, $F_{z2}$ and $F_{z3}$ have at least approximately the same size and meet the requirements $F_{z3} \leq F_{z2} \leq F_{z3}$. A damping effect reducing the shifting impact is achieved with the angle $K_A$ larger than $K_E$ or with $K_{actual} > K_{desired}$.

Figure 31:
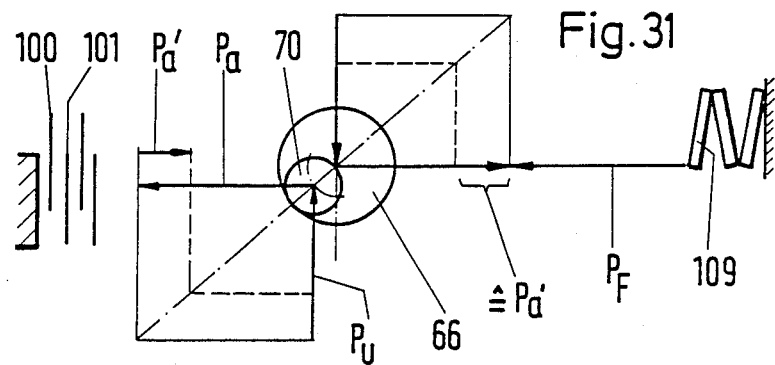
FIG. 31 illustrates a force diagram.

When the clutch is engaged (position E of the gearshift sleeve or of the guide sleeve), there exists a force equilibrium both in axial direction and also in peripheral direction. This is illustrated in FIG. 31 in the form of a force diagram. If during disengaging the axial force $P_2$ is reduced by a value $P_a$, for example by applying a force from outside onto the gearshift sleeve, then also the peripheral force $P_u$ is reduced and to the same degree also the reaction forces. A surplus of the spring forces $P_F$, with which the eccentric of bolt 70 and block 66 is turned back, is thereby created so that only the force needed to overcong the difference of hte angles $K_{desired}$ and $K_{actual}$ must be applied from outside.

Figure 32:
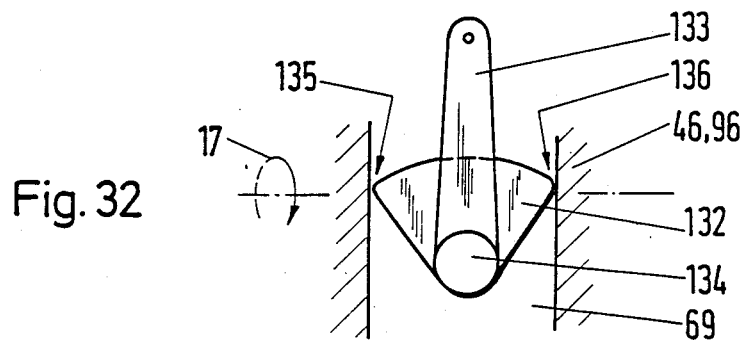
FIGS. 32 to 34 illustrate the cooperation of a trip cam with the gearshift sleeve in vaarious positions.
Figure 33:
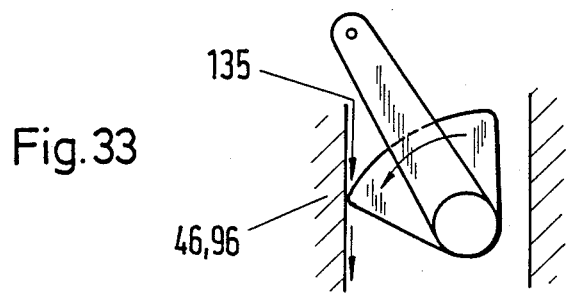
Figure 34:
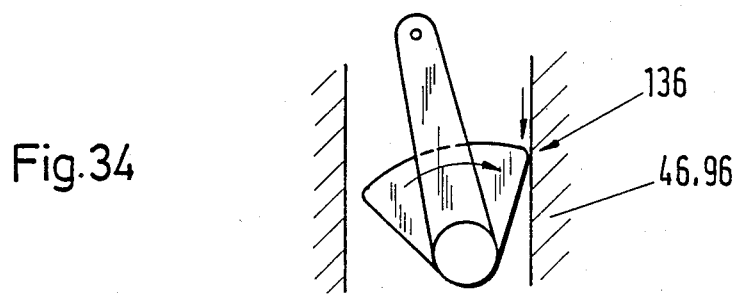

For clutches on shafts with an always constant direction or rotation 17, it is possible to also utilize the friction between a cam acting onto the gearshift sleeve to make the engaging and also the disengaging easier. FIG. 32 schematically illustrates a cam 132 which, in the neutral position, lies symmetrically with respect to the peripheral groove 69 of the gearshift sleeve 46, 96. A gearshift lever 133 is arranged on the outside onthe gear unit in order to operate, that is, rotate the cam 132. The axis of rotation 134 of the cam 132 and of the gearshift lever 133 lies - viewed in direction of rotation 17 - behind the profile edges 135, 136 of the cam. If the cam 132 is swung to the left to engage the clutch (FIG. 33), then the friction created between the gearshift sleeve 46, 96 and the profile edge 135 will try to swing the cam 132 further, which results in a further yielding of the gearshift sleeve 46, 96 to the left. If the cam 132 is then swung to the right for disengaging (FIG. 34), then the friction created between the gearshift sleeve 46, 96 and the profile edge 136 will try to swing the cam further to the right and will thereby move the gearshift sleeve 46, 96 further to the right, that is in the sense of the disengagement.

Although particular preferred embodiments of the invention have been disclosed in detail for illustrative purposes, it will be recognized that variations or midifications of the disclosed apparatuses, including the rearrangement of parts, lies within the scope of the present invention.

The embodiments of the invention in which an exclusive property or privilege is claimed are defined as follows:

1. In a shiftable friction clutch having first and second friction members for operably connecting a selected drive gear to a shaft, comprising a gearshift sleeve encircling said shaft and first support means for supporting said gearshift sleeve for axial movement and for a limited rotational movenment relative to said shaft during an engaging operation said first friction member belonging to a first clutch half being axially movable by said gearshift sleeve and which through friction surfaces cooperates with said second friction member belonging to a second clutch half, said first and second friction members, during engagement being pressed onto one another by an engagement force developed against the bias of a spring means, at least one spring-loaded drop-in pin mounted on said shaft and being guided for movement radially with respect to said shaft having means for initially locking said drop-in pin to said gearshift sleeve ina neutral position and which during the engaging operation engages with and produces an axially directed initial force on an inclined surface on said gearshift sleeve to initiate said engagement of said shiftable friction clutch, the improvement wherein bolt means are mounted in openings provided in said gearshift sleeve and wherein block means are provided and include second support means for mounting said block means relative to said shaft, at least one of said bolt means and said block means having a peg means provided thereon and the other of said bolt means and said block means having a recess receiving said peg means therein, the mutually contacting surfaces of said peg means and said recess, which contact one another during a change in condition of said shiftable friciton clutch from a neutral condition to an engaged condition, defining an angular relationship to a plane of rotation, said mutually contacting surfaces at a location corresponding to a position of said bolt means and said block means when said shiftable friction clutch is in the neutral condition defining a larger angle with said plane of rotation than said mutually contacting surfaces at a location corresponding to a position of said bolt means and said block means when said shiftable friction clutch is in the engaged condition.

2. The friction clutch according to claim 1, wherein said gearshift sleeve is connected to said shaft by said block means which is substantially rotatable perpendicularly with respect to the axis of said shaft such that the engaging operation of said gearshift sleeve effects during a clutch engagement both a rotation of said gearshift sleeve relative to said shaft and also an additional axial movement needed to reinforce said initial force, said additional axial movement being reduced with an increasing relative rotation, and the axial movement of said gearshift sleeve effecting during a clutch disengaging operation an oppositely directed rotary and addition axial movement,said oppositely directed additional axial movement increasing with a decreasing relative rotation.

3. The friction clutch according to claim 2, wherein said second support means is defined by a guide sleeve mounted fixed against rotation, however, axially movably on said shaft said guide sleeve being supported on a side remote from said first friction member by said spring means, and wherein said block means includes a semicircularly shaped or crescent-shaped cross section thereby defining at least one of a straight and concave side surface, said block means being received rotatably in a radial bore in said guide sleeve, said at least one of a straight and concave side surface extending through the axis of rotation of said block means, said peg means engaging with a free end thereof said at least one of a straight and concave side surface of said block means such that - viewed in the direction of rotation of said clutch - in the neutral condition of said clutch said axis pf said peg means lies in the rotational plane behind said axis of rotation of said block means.

4. The friction clutch according to claim 3, wherein the radius of curvature of said concave side surface of said block means corresponds substantially with half the diameter of said bolt means.

5. The friction clutch according to claim 4, wherein at least one of said block means and said bolt means is supported by roller means 6. The friction clutch according to claim 5, wherein stop means is provided for limiting the rotary movement of at least said block means.

7. The friction clutch according to clamim 4, wherein stop means is provided for limiting the rotary movement of at least said block means.

8. The friction clutch according to claim 3, wherein at least one of said block means and said bolt means is supported by roller means.

9. The friction clutch according to claim 3, wherein stop means is provided for limiting the rotary movement of at least said block means.

10. The friction clutch according to claim 3, wherein said spring means includes a spring arranged on each aval side of said guide sleeve.

11. The friction clutch according to claim 2, wherein said spring means is arranged on a side of said first and second friction members remote from said gearshift sleeve, wherein said block means consists of a block member having an portion with a semicircularly shaped or crescent-shaped cross section, said block member bing received rotatably in a radial bore, which consitutes said second support means, of said shaft, a straight or concave side surface of said poriton extending through an axis of rotation of said block member, and said bolt means being received axially parallel thereto in said gearshift sleeve, said bolt means engaging with said straight or concave side surface of said portion such that - viewed in the direction of rotation of said shiftable friction clutch - in a neutral condition of said shiftable friction clutch, said axis of said bolt means lies in the rotational plane behind the axis of rotation of said block member.

12. The friction clutch according to claim 11, wherein a radius of curvature of said concave side surface of said portion corresponds substantially with half the diameter of said bolt means.

13. The friction clutch according to claim 11, wherein at least one of said block member and said bolt means is roller supported.

14. The friction clutch according to claim 11, wherein a stop means is provided for limiting a rotary movement of at least said block member.

15. The friction clutch according to claim 1, wherein said block means includes a pair of block members rotatably oriented on parallel axes which extend perpendicular to said axis of said shaft, said pair of block members being mirror images of one another and having opposing surfaces sandwiching therebetween said bolt means.

16. The friction clutch according to claim 15, wherein said block members each have at least one set-back section, into which projects a section of the other block member.

17. The friction clutch according to claim 1, wherein asn eccentric trip cam is provided, the profile of which has in an idling position profile edges resting on opposing and rotating shifting surfaces on said gearshift sleeve, said trip cam, when swung out of the idling position, being narrower than the spacing between said two opposing surfaces, wherein when the arrangement of said friction clutch is on said shaft which rotates only in one direction of rotation, the center of rotation of said trip cam - viewed in direction of rotation of said clutch - lies behind the profile edges of said trip cam.

18. The friction clutch according to claim 1, wherein a change of the angle and a course of the characteristic curve of he spring are adjusted to one another over the axial path of movement of at least one of the gearshift sleeve and the guide sleeve such that the initial force produced by at lease the one drop-in pin stays equally small over a path of the axial opoeration movement of the gearshift sleeve or decreases during the engaging operation.

19. The friction clutch according ot claim 1, wherein said friction clutch is arranged in a shaft rotating only in one direction of rotation, wherein at least of drop-in pin is loaded by a two-legged torsion spring acting in peripheral direction of said friction clutch, said torsion spring engaging with one section of its winding a surface of said drop-in pin remote from said gearshift sleeve, one leg of said torsion spring being fixed in at least one of said shaft and said guide sleeve and the other leg engaging a radial recess in said gearshift sleeve, said two legs defining an acute angle.

* * * * *

UNITED STATES PATENT AND TRADEMARK OFFICE
CERTIFICATE OF CORRECTION

PATENT NO. : 4 878 571

DATED : November 7, 1989

INVENTOR(S) : Christoph SACHER et al.

It is certified that error appears in the above-identified patent and that said Letters Patent is hereby corrected as shown below:

Column 8, line 68; change "movenment" to ---movement---.

Column 9, line 12; change "ina" to ---in a---.

line 27; change "friciton" to ---friction---.

line 43; change "a clutch" to ---clutch---.

line 49; change "addition" to ---additional---.

Column 10, line 1; change "pf" to ---of---.

line 13; change "clamim" to ---claim---.

line 24; change "aval" to ---axial---.

line 29; change "an portion with a" to
---a portion with line 31; change "bing" to ---being---.

lines 31 and 32; change "consitutes" to
---constitutes---.

line 33; change "poriton" to ---portion---.

line 65; change "asn" to ---an---.

Col. 9, line 50; change "movement,said" to --movement, said--

UNITED STATES PATENT AND TRADEMARK OFFICE
CERTIFICATE OF CORRECTION

PATENT NO. : 4 878 571

DATED : November 7, 1989

INVENTOR(S) : Christoph SACHER et al.

It is certified that error appears in the above-identified patent and that said Letters Patent is hereby corrected as shown below:

Column 11, line 2; after "opposing" insert ---shifting---.

line 9; change "he" to ---the---.

line 12; change "lease" to ---least---.

line 13; delete "opoeration".

Column 12, line 3; change "ot" to ---to---.

line 4; change "in a" to ---on a---.

line 5; change "least of" to ---least one---.

Signed and Sealed this

Ninth Day of April, 1991

*Attest:*

HARRY F. MANBECK, JR.

*Attesting Officer*      *Commissioner of Patents and Trademarks*